Figure 1:
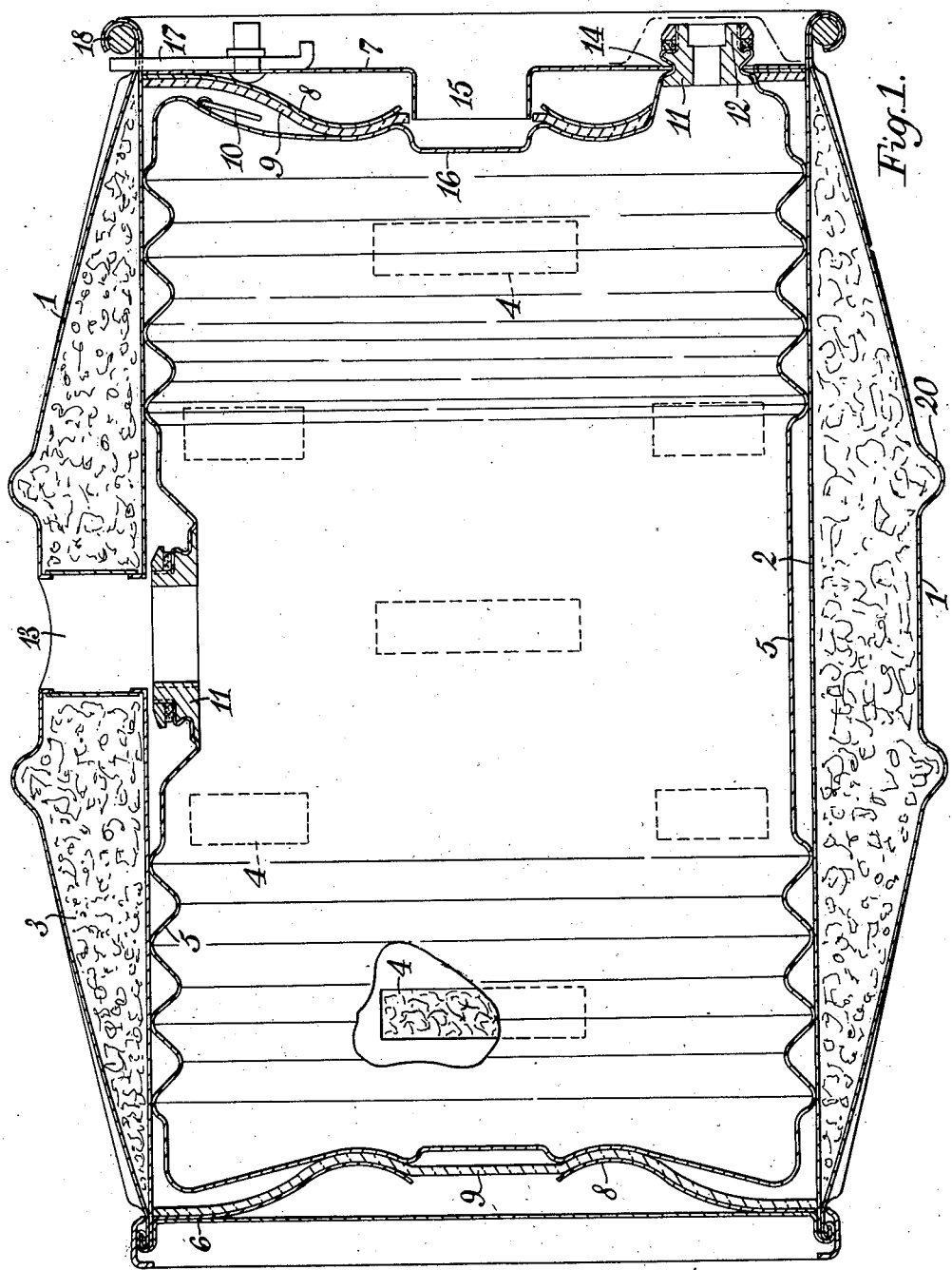

June 2, 1936.  K. W. MAUSER  2,043,183
DOUBLE WALLED VESSEL
Filed Aug. 23, 1933  3 Sheets-Sheet 1

K. W. Mauser
INVENTOR
By: Marks & Clerk
Attys.

June 2, 1936.  K. W. MAUSER  2,043,183
DOUBLE WALLED VESSEL
Filed Aug. 23, 1933  3 Sheets-Sheet 2
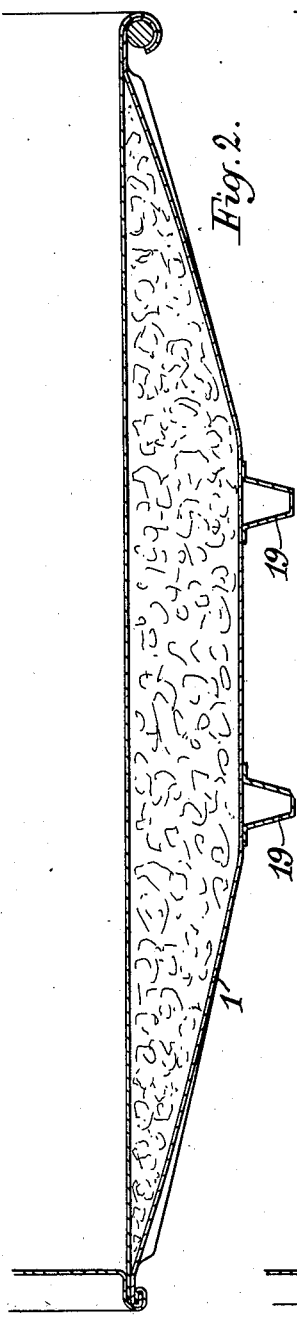
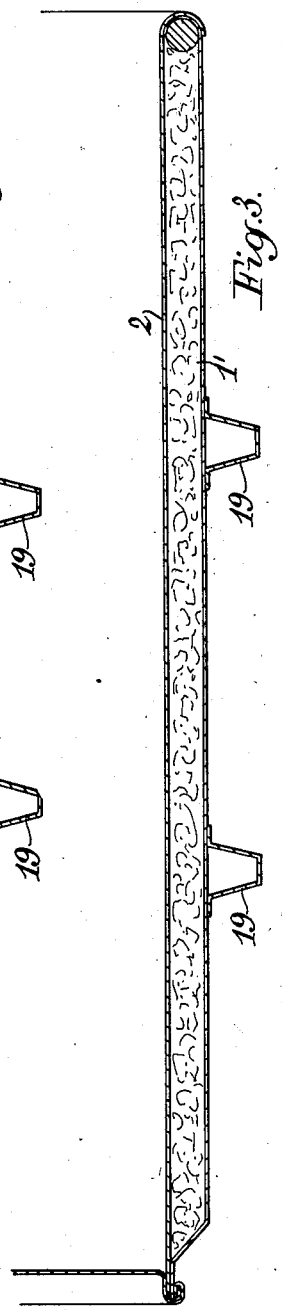
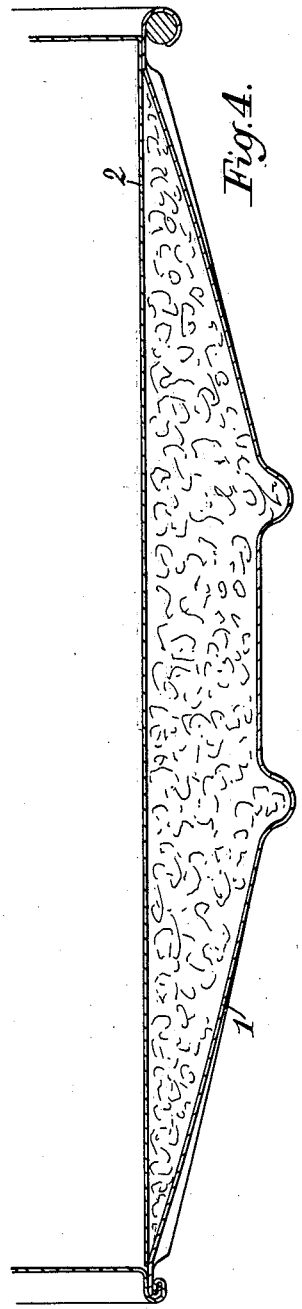
K. W. Mauser
INVENTOR
By Marks & Clerk
Attys.

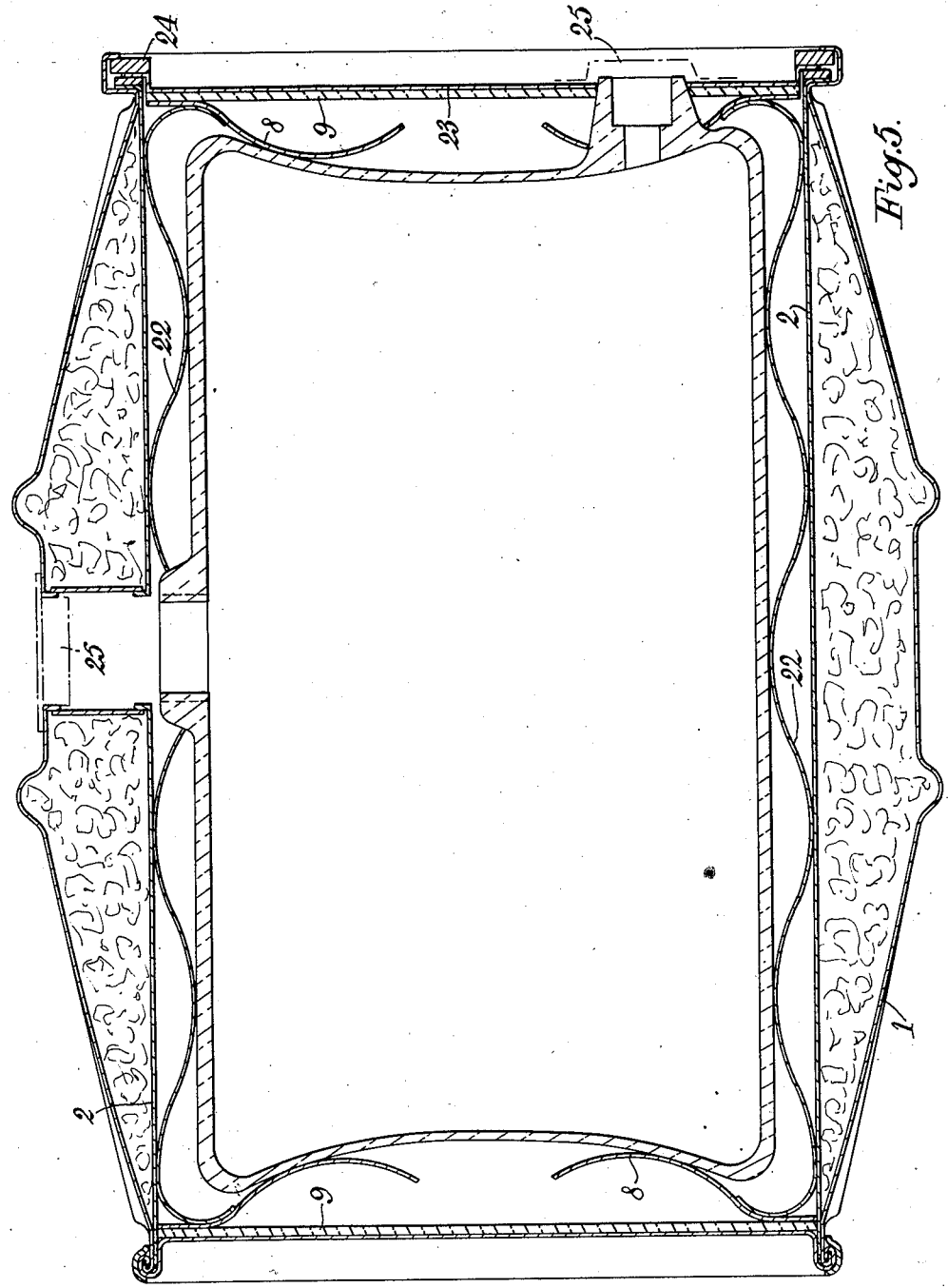

Patented June 2, 1936

2,043,183

UNITED STATES PATENT OFFICE 2,043,183

DOUBLE-WALLED VESSEL

Karl Wilhelm Mauser, Waldeck, Germany

Application August 23, 1933, Serial No. 686,451
In Germany June 30, 1933

2 Claims. (Cl. 220—9)

This invention relates to a double-walled metal vessel for transport and storage of beverages, more particularly beer, in which the inner vessel for holding the beverage is removable. The removable inner vessel has the advantage over the fixed vessel that a separate cleansing or sterilization and a storage of the beverage can be effected without the outer vessel, so that the latter is used only for transporting the storage vessels when ready for despatch. A further advantage is that the inner vessel can be kept under observation, which is of importance, for example, in case of the occurrence of corrosion.

The hitherto known removable vessels have numerous disadvantages which in spite of the above-mentioned advantage make it impossible to use them in most cases.

The construction of the outer vessel did not meet the requirements for transport purposes. In addition to the high initial cost, costs for repair were constantly incurred.

The hitherto usual method of supporting the inner vessel produced a rigid connection with the outer vessel so that the stresses due to shocks acting on the latter were directly transmitted to the inner vessel.

For carrying beer and other beverages which are sensitive to variations of temperature in hot seasons or in tropical lands, double-walled vessels have been used on account of their good insulation. In the hitherto known removable vessels, the insulating material in the space between the outer and inner vessels fell out every time the inner vessel was removed and had to be replaced before inserting the vessel again. Apart from the loss of time occasioned thereby, there was no guarantee of good insulation.

The arrangement of marginal reinforcements on the outer vessel and the construction of the end and cover, more particularly the cover closure, require a considerable projection of the edge over the ends of the outer vessel so that the space taken up by the inner vessel in the outer vessel was very large. It is not necessary to refer particularly to the disadvantages in consequence of this.

The securing of the bung in the metal beer containers did not meet the requirements which are placed on reliable bung constructions. This led to numerous disadvantages especially as regards the tightness of the connection.

The object of the present invention is to remove these disadvantages completely.

For the outer wall it may be of advantage to provide a known iron vessel which is wider at the middle and the reinforcement of which consists of wave-like constrictions at the two ends and large ridges at the middle. In place of these ridges, rolled hollow tyres or similar rolling rings, may be provided which are secured by known means. A suitably reinforced cylindrical vessel may be employed for the outer wall instead of the enlarged vessel.

For receiving or supporting the inner vessel a cylindrical wall of sheet iron is constructed in the outer vessel which may be fixed or removable. The inner vessel which lies closely against this sheet metal wall is no longer subjected directly to the stresses due to shocks acting on the outer vessel. This arrangement is especially favourable for inner vessels which are subjected to high internal pressure. For supporting the inner vessel from the bottom and cover of the outer vessel, resilient insertions, for example, spring metal discs, strong springs or other springing devices are provided so that here also a direct action of stresses due to shocks on the inner vessel is prevented. The combination of the outer vessel with the built in cylindrical sheet metal wall produces great stability so that the resistance of the vessel to all influences in transport is ensured. The outer vessel is open at its end and can be closed by a cover.

The arrangement of the cylindrical sheet metal wall in the outer vessel gives the possibility of very good insulation, the insulating material being placed in the space between the outer vessel and the inner sheet metal wall. For inserting the insulating material the latter is provided with suitable open or closable apertures. The insulating material can be easily changed. The bottom and the cover of the outer vessel are insulated from the inner vessel by layers of asbestos or other suitable material.

The advantageous construction of the bottom and cover of the outer vessel avoids dead space in the outer vessel. The use of a suitable bolt, wedge ring or other closure makes it possible for the cover to engage closely below the edge of the outer vessel without the projecting parts going outside the protection of the reinforced edge of the vessel.

For the very favourable utilization of space of the inner vessel within the outer vessel, it is of great importance that the diameter of the inner vessel coincides with the internal end diameter of the outer vessel.

In general the cover is not provided so as to close tightly. In cases where the inner barrel and the insulation have to be protected against corrosion from the outside, for example, when carried by sea, a closely fitting cover with suitable closure, for example, a wedge ring closure is used.

The apertures provided in the cover and at the widest part for the bung are in this case provided with removable tightly fitting caps.

The bung is secured in any preferred manner. An improvement of this bung construction for the present purpose is obtained by the bushing flange being extended beyond the edge of the fitting for the head in order to receive a securing means. The apertures provided in the widest part and the cover of the outer barrel allow access to the bungs. When the inner barrel is inserted, the latter are brought below the apertures in the outer vessel by known means. At further aperture on the cover of the barrel allows the symbols on the inner barrel to be seen.

The outer vessel is preferably galvanized. An inner vessel may be made of any metal which is suitable for the intended use.

For carrying beverages of sensitive flavor, it is often necessary to employ containers of glass, ceramic or other fragile materials. Hitherto there has been no suitable arrangement which enabled this to be fully protected against stresses due to shocks and at the same time to be well insulated.

For this purpose the outer barrel with the shock-proof inner wall according to the present invention is an arrangement which meets all requirements. The fragile inner container is held in a resilient suspending insertion which is supported by the inner sheet metal wall in the outer barrel. The container is doubly protected by the division of the shocks on account of being supported by the inner wall of the outer barrel and by the resilient construction of the suspending arrangement by means of known devices. The latter may of course be replaced by other insertions having a resilient or spring action. The resilient support from the bottom and cover of the outer vessel is effected in the same manner as with the inner vessel of metal.

By the combination of features which in themselves are known with the novel arrangements, the double-walled metal barrel according to the present invention forms an improvement which is of advantage in every respect. On account of the rational possibility of manufacture, the barrel has the advantage of cheapness. It is essentially suitable for the transport of beverages by sea and in tropical lands.

In the accompanying drawings Fig. 1 shows a double-walled removable beer barrel with a widened outer barrel in the form already described. The inner wall 2 is here rigidly connected with the outer wall 1. For inserting and changing the insulating material 3, the cover 2 has open or closeable apertures 4. The removable inner vessel 5, which is arranged to fit in the wall 2, is supported by resilient means 8 against the bottom 6 and the cover 7. For insulation against the bottom and cover, insertions 9 are employed. The removal of the inner vessel is effected by means of hinged rings 10 or other suitable devices. For filling and emptying the inner vessel 5, two bungs 11 are employed.

The apertures 13 and 14 in the wall 1 and cover 7 allow of access to the bungs 11. The apertures 15 in the cover allow the symbols marked on the surface 16 of the inner barrel to be seen. The ring closure or bolt closure 17 on the cover 7 which in this case is not made to fit tightly engages under the reinforced edge 18 of the outer barrel.

Fig. 2 shows the arrangement of two hollow tyres 19 which are provided instead of the ridges 20 on the outer wall 1. In the constructional example according to Fig. 3, instead of the enlarged outer barrel 1, a cylindrical barrel 1' is provided on which hollow tyres 19 are secured.

Fig. 4 shows a constructional form of the outer barrel in which the inner wall 2 is arranged removably.

Fig. 5 shows a double-walled removable beer barrel in which the inner vessel 21 consists of glass, ceramic or other fragile material. This is arranged in a resilient suspending device 22 which is supported against the inner wall 2. Instead of the suspended insertion, of course other elastic or resilient devices could be employed.

In the constructional example according to Fig. 5 it is also shown how the cover 23 can be arranged so as to fit tightly. The closing means here is, for example, a wedge ring closure 24. The apertures in the cover and wall of the outer barrel are provided with closely fitting removable caps 25.

What I claim is:
1. A double-walled metal vessel for transporting and storage of beverages comprising an outer vessel having one end opened and the other end closed, a cover for said open end, means on the outer vessel on which it can be rolled, a cylindrical sheet metal wall fixed in the outer vessel at a distance from the wall thereof and having a diameter corresponding with the internal diameter of the open end of said vessel, resilient members at each end of the outer vessel, a removable inner metal vessel of a diameter slightly less than the internal diameter of said open end and held by the sheet metal wall and the resilient members.

2. A double-walled metal vessel as claimed in claim 1 characterized by the provision of openings in said sheet metal wall, an insulating material between said sheet metal wall and the outer vessel for completely insulating the removable inner passage, said insulating material being visible and renewable through the openings in said sheet metal wall.

KARL WILHELM MAUSER.